(12) United States Patent
Noh et al.

(10) Patent No.: US 7,676,084 B2
(45) Date of Patent: Mar. 9, 2010

(54) APPARATUS FOR PROCESSING DEAD PIXEL

(75) Inventors: Yo Hwan Noh, Gyeonggi-do (KR); Wang-Hyun Kim, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 896 days.

(21) Appl. No.: 11/424,915

(22) Filed: Jun. 19, 2006

(65) Prior Publication Data

US 2007/0291142 A1 Dec. 20, 2007

(51) Int. Cl.
*G06K 9/00* (2006.01)

(52) U.S. Cl. .................. 382/167; 382/162; 382/181; 382/224; 348/246; 348/247

(58) Field of Classification Search .......... 382/220, 382/268; 348/241, 246, 247, 272, 273
See application file for complete search history.

(56) References Cited

U.S. PATENT DOCUMENTS

| | | | | |
|---|---|---|---|---|
| 4,805,023 | A * | 2/1989 | Younse et al. | 348/247 |
| 5,327,246 | A * | 7/1994 | Suzuki | 348/246 |
| 5,995,675 | A * | 11/1999 | Hwang | 382/268 |
| 6,965,395 | B1 | 11/2005 | Neter | |
| 2002/0012476 | A1 * | 1/2002 | Dillen et al. | 382/274 |
| 2002/0196354 | A1 * | 12/2002 | Chang et al. | 348/246 |
| 2005/0276510 | A1 * | 12/2005 | Bosco et al. | 382/275 |

FOREIGN PATENT DOCUMENTS

| | | |
|---|---|---|
| KR | 10-0362178 | 11/2001 |
| KR | 10-2005-0034091 | 4/2005 |
| KR | 10-0595747 | 6/2006 |

\* cited by examiner

*Primary Examiner*—Andrew W Johns
*Assistant Examiner*—Jason Heidemann
(74) *Attorney, Agent, or Firm*—Birch, Stewart, Kolasch & Birch, LLP

(57) ABSTRACT

The present invention is related to a method and an apparatus for processing a dead pixel, more specifically to a method and an apparatus thereof for detecting and compensating a dead pixel that can maintain a good image quality by reducing image distortion and deterioration. With the present invention, the distortion of an image, caused by erroneously classifying a normal pixel of an inputted image as a dead pixel, is significantly reduced, thereby improving the quality of a processed image. Moreover, based on the characteristics of the inputted image, the algorithm and accuracy of detecting a dead pixel can be adjusted.

12 Claims, 6 Drawing Sheets

APPARATUS FOR PROCESSING DEAD PIXEL

BACKGROUND OF INVENTION

The present invention is directed to an apparatus for processing a dead pixel, more specifically to an apparatus for detecting and compensating a dead pixel that can maintain excellent image quality by reducing image distortion and image deterioration.

An image sensor has a two-dimensional arrangement of pixels, each of which transforms light to an electrical signal according to the luminosity. By measuring the electrical signal, the intensity of light entered into each pixel can be inferred, and using this, images made up of pixels can be constructed.

As such, an image sensor comprises pixel arrays, which consists of several hundred thousand to several million pixels, a device to convert analog data sensed from a pixel to digital data, and several hundred to several thousand storage devices. Due to the large number of devices, an image sensor is always exposed to a possibility of making an error in the process, and such an error can cause dead pixels, which become an important factor determining the level and price of the image sensor. The pixel value resulted from a dead pixel is characterized by being exceedingly larger or smaller than the pixel values of neighboring pixels.

FIG. 1 shows a method for detecting and compensating dead pixels in accordance with the prior art. As shown in FIG. 1, in case an image sensor outputs an electrical signal (i.e. a sensor output), corresponding to an optical image inputted through a lens, like the reference number 110, the pixel value corresponding to each pixel is stored in a register temporarily, processed for dead pixel detection and compensation, converted to a corresponding electrical signal, and then sent to an image processing device.

Once the electrical signals 110 corresponding to an optical image inputted through a lens are converted to digital signals by the image sensor and outputted, the register 115 receives and stores the outputted digital signals in sequence. The register stores the pixel value corresponding to the order of R-G-R-G or B-G-B-G. Each pixel value temporarily stored in the register 115 is outputted to an imaging processing device in the same order of input, through the first-in-first-out method.

In this process, the pixel value of what is recognized as a dead pixel is detected and compensated in the following process: For example, in order to determine if the pixel value stored in G2 corresponds to a dead pixel, it is determined if the difference between the pixel value (VG2) of a pixel stored in G2 and the pixel value (VG1) of a pixel of the same kind stored in the following, neighboring location satisfies the condition of |VG2−VG1|>the reference value, and if the difference between the pixel value (VG2) of a pixel stored in G2 and the pixel value (VG3) of a pixel of the same kind stored in the preceding, neighboring location (G3) satisfies the condition of |VG2−VG3|>the reference value.

If the pixel value stored in G2 does not satisfy any one of the above equations, the pertinent pixel value (VG2) is perceived to be normal, and thus no compensation is made to the pixel value of the pertinent location (step 125). However, if the pixel value stored in G2 satisfies all of the above equations, the pertinent pixel value (VG2) is perceived to be a dead pixel, and is replaced using the data of preceding and following pixels. And through the process described above, the pixel value stored in G2 is compensated and is converted to an electrical signal 130 corresponding to the compensated pixel value to be sent to an image processing device.

U.S. Pat. No. 6,965,395, issued to Neter, discloses one of the conventional method. The prior art reference discloses a color imaging system which employs an on-the-fly bad pixel detection and correction process using a signal processing procedure performed during readout of the imaging device output signals, while those signals are still in analog form. This on-the-fly bad pixel detection and correction process is capable of random access readout and includes programmable gain amplifiers, an A/D converter, one or more registers for temporary storage, and a signal processing block. In this on-the-fly mode of operation, the signal processing unit performs the detection step via horizontal, vertical and diagonal conditional median filters. If the pixel whose value is being examined, which may be the middle or center pixel within a horizontal, vertical or diagonal set of pixels, the is not within the condition limits, its value is replaced in the correction step. The replacement value may be determined by the directional median that possesses the minimum variation. The value chosen can be, by way of example, a median, weighted mean, or average value of two or more pixels in the neighborhood in which the bad pixel is situated.

However, the conventional methods described above have the problem of using too much hardware resources. Besides, crowded images or high-contrast images can be erroneously perceived as dead pixels, resulting in unnecessary compensation. The recovered image, therefore, has much more distortion than the actual image.

Further objectives and advantages of the present invention will become apparent from a careful reading of a detailed description provided hereinbelow, with appropriate reference to the accompanying drawings.

SUMMARY OF INVENTION

In order to solve above problems, it is an object of the present invention to provide an apparatus for processing dead pixels that can improve the accuracy of detecting dead pixels.

It is another object of the present invention to provide an apparatus for processing dead pixels that can select an algorithm for detecting dead pixels according to the characteristics of inputted image.

It is yet another object of the present invention to provide an apparatus for processing dead pixels that can adjust the accuracy of detecting dead pixels according to the characteristics of inputted image.

In order to achieve the above objects, an aspect of the present invention features an apparatus for detecting a dead pixel. The apparatus comprises: a pixel value storage unit, storing a series of pixel values, which include a reference pixel value; a dead pixel processing unit, bypassing the reference pixel value by comparing the reference pixel value with a neighboring same kind pixel value or generating a compensated pixel value by using the neighboring same kind pixel value; a frequency detection unit, generating a frequency bypass flag if the differences between a plurality of same kind pixel values are smaller than a first threshold; a pattern detection unit, generating a pattern bypass flag if the difference between the reference pixel value and a neighboring pixel value is smaller than a second threshold; and a selection unit, selecting one of the reference pixel value and the output value of the dead pixel processing unit by the combination of the frequency bypass flag and the pattern bypass flag.

Another aspect of the present invention features an apparatus for detecting a dead pixel, comprising: a pixel value storage unit, storing a series of pixel values, which include a reference pixel value; a dead pixel processing unit, bypassing the reference pixel value by comparing the reference pixel value with a neighboring same kind pixel value or generating a compensated pixel value by using the neighboring same kind pixel value; a pattern detection unit, generating a bypass flag if the difference between the reference pixel value and a neighboring pixel value is smaller than a threshold; and a selection unit, selecting one of the reference pixel value and the output value of the dead pixel processing unit by the bypass flag.

Another aspect of the present invention features an apparatus for detecting a dead pixel, comprising: a pixel value storage unit, storing a series of pixel values, which include a reference pixel value; a dead pixel processing unit, bypassing the reference pixel value by comparing the reference pixel value with a neighboring same kind pixel value or generating a compensated pixel value by using the neighboring same kind pixel value; a frequency detection unit, generating a frequency bypass flag if the differences between a plurality of same kind pixel values are smaller than a threshold; and a selection unit, selecting one of the reference pixel value and the output value of the dead pixel processing unit by the frequency bypass flag.

BRIEF DESCRIPTION OF DRAWINGS

These and other features, aspects, and advantages of the present invention will become better understood with regard to the following description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts or structure.

DETAILED DESCRIPTION

Hereinafter, a preferred embodiment of the present invention will be described with reference to the accompanying drawings.

Figure 1:
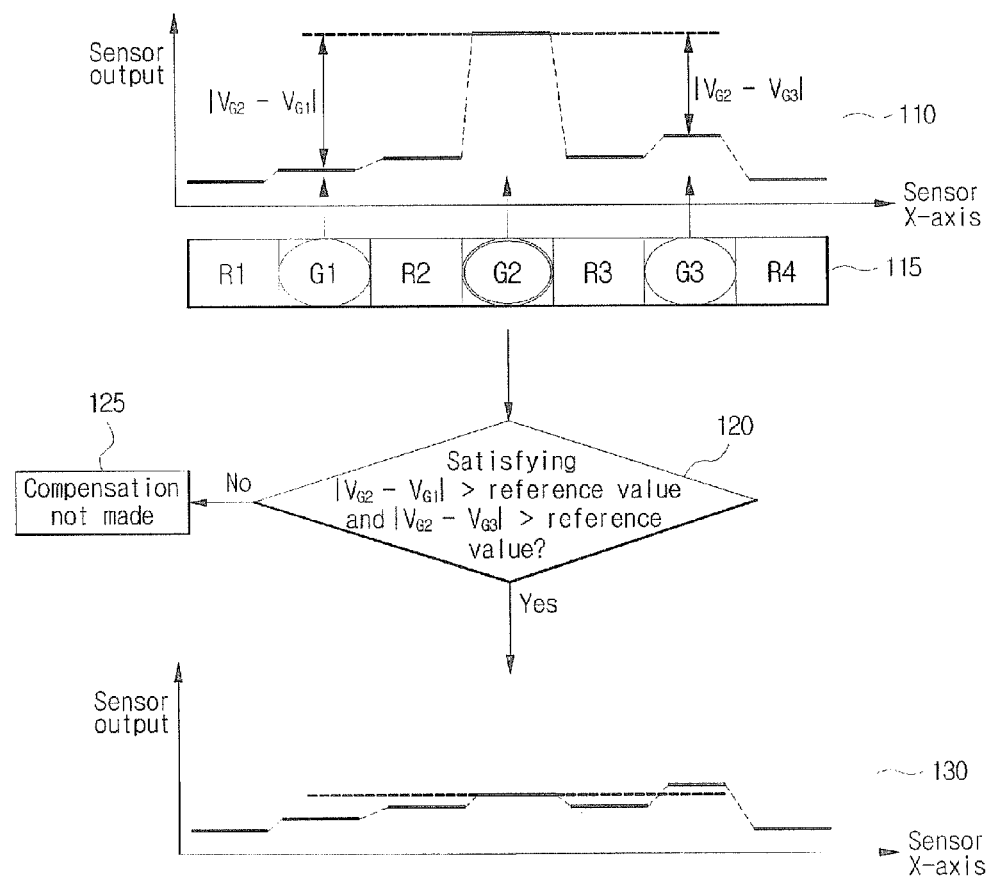
FIG. 1 shows a method for detecting dead pixels in accordance with the prior art.
Figure 2:
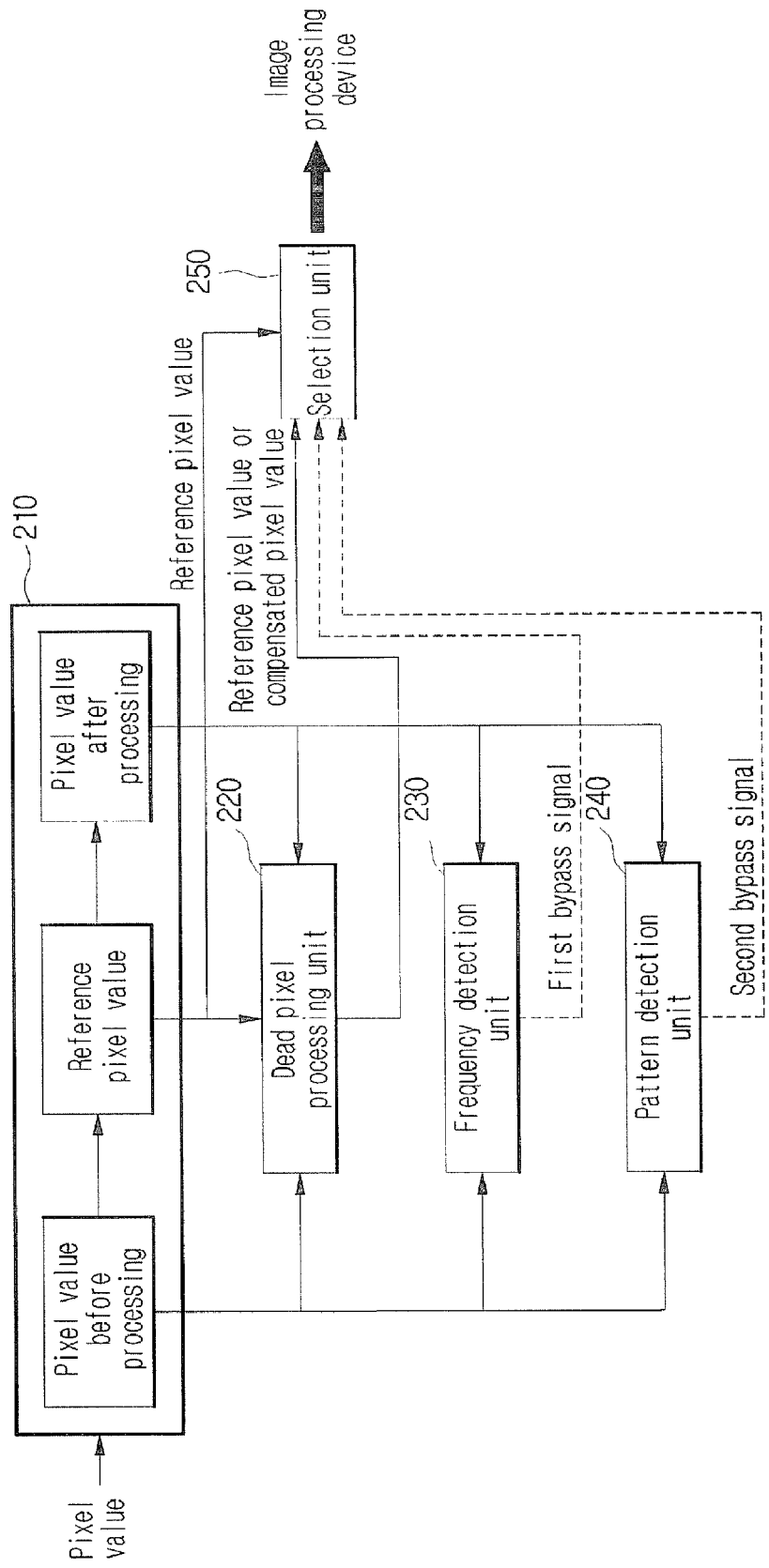
FIG. 2 shows a block diagram of an apparatus for processing dead pixels in accordance with the present invention.

FIG. 2 is an apparatus for processing dead pixels in accordance with the present invention.

A pixel value storage unit 210 stores a series of pixel values inputted in sequence and processes the series of pixel values in the first-in-first-out method. The series of pixel values inputted in the pixel value storage unit 210 can be distinguished as a reference pixel value, a pre-processed pixel value, and a post-processed pixel value, in accordance with their input order. The pre-processed pixel value and the post-processed pixel value are used to determine whether the reference pixel value is a dead pixel. The reference pixel value means an object for determining a dead pixel value, while the neighboring pixel value refers to pixel values located in the front and back of the reference pixel value, and the neighboring same kind pixel value refers to a pixel value that is closest to the reference pixel value among the pixel values of the same kind as the reference pixel value.

A dead pixel processing unit 220 compares the reference pixel value and the neighboring same kind pixel value located in the front and back of the reference pixel value and determines the possibility of the reference pixel value being a dead pixel. To determine a dead pixel, various methods, including the threshold method, the weighted method, and the threshold count method, are used. The threshold method determines the presence of a dead pixel by determining if the difference between the reference pixel value and the neighboring same kind pixel value exceeds a predetermined threshold. The weighted method determines the presence of a dead pixel by comparing the multiplication of the neighboring same kind pixel value and the weighted value with the reference pixel value. In the threshold count method, the difference between the same kind pixels that exceeds a predetermined threshold is counted, and the pixel whose difference exceeds a predetermined number is considered a dead pixel. There can be many other methods, and the combinations thereof, for determining a dead pixel, but the weighted method will be described hereinafter.

Reference pixel value=$G_1$
Neighboring same kind pixel values=$G_0$ and $G_2$
Weighted value=$a_1$ Condition for determining a dead pixel: $G_1 > a_1 G_0$
AND $G_1 > a_1 G_2$     Eq. 1

If G1 satisfies Eq. 1, the above reference pixel value is determined to be a dead pixel. Here, other methods for determining a dead pixel can be added in order to further determine if the reference pixel value satisfying the above Eq. 1 is a dead pixel. It can be determined if the reference pixel value satisfying the above Eq. 1 is smaller than the upper threshold, larger than the lower threshold, or between the upper threshold and the lower threshold in order to conclude if the reference pixel value is a dead pixel.

If the reference pixel value is determined to be a dead pixel, the dead pixel processing unit 220 calculates the average of two neighboring same kind pixel values and outputs the calculated compensated pixel value. If the reference pixel value is determined not to be a dead pixel, on the other hand, the dead pixel processing unit 220 outputs the reference pixel value. The weighted value and the upper/lower threshold, used by the dead pixel processing unit 220 as a reference for determination, are stored in an internal register, and can be substituted by a register value inputted from outside.

Figure 3:
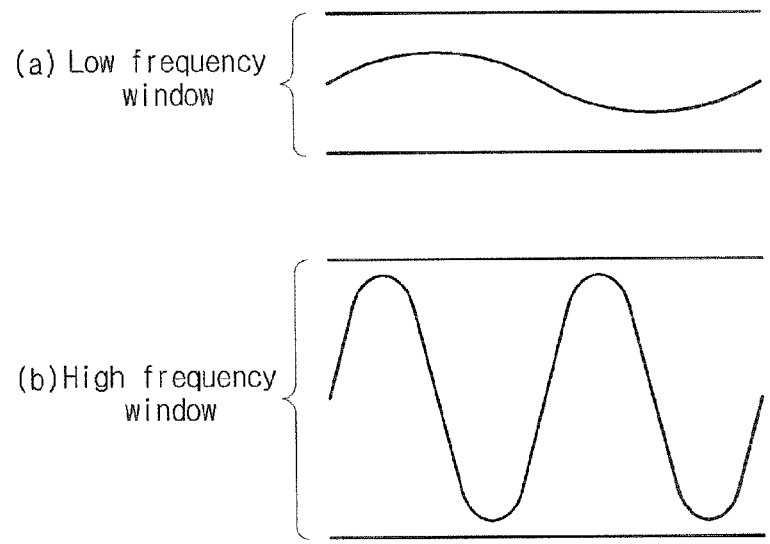
FIG. 3 illustrates a low-frequency image window and a high-frequency image window.

A frequency detection unit 230 determines if the differences between the same kind pixel values are smaller than a predetermined threshold, and, if smaller, outputs a frequency bypass flag. Here, different values for the threshold can be used depending on the frequency of the image. An image with a low frequency has little difference in the same kind pixel values, as shown in FIG. 3(a), and an image with a high frequency has a bigger difference in the same kind pixel values, as shown in FIG. 3(b). The frequency detection unit 230 calculates the relative differences between a plurality of same kind pixel values having the same elements among a plurality of pixel values located in the pixel value storage unit 210, and determines if the calculated differences are smaller than the upper threshold, bigger than the lower threshold, or between the tipper threshold and the lower threshold. Hereinafter, the area that is smaller than the upper threshold, bigger than the lower threshold, or between the upper threshold and the lower threshold is referred to as a window. The upper threshold and/or the lower threshold is stored in a register of the frequency detection unit 230, and can be substituted by a register valued inputted from outside. Moreover, the register can further comprise data that selects the operation of the frequency detection unit 230. Therefore, the frequency detection unit 230 may not operate in accordance with the register value.

Referring to FIGS. 3(a) and 3(b), the low frequency window is applied to an image with little change, and if all of the differences between the absolute values of the reference pixel value and same kind pixel values are located in the low frequency window, it is determined that the frequency bypass condition is satisfied. The high frequency window is applied to an image with large change, and if all of the differences between the absolute values of the reference pixel value and same kind pixel values are located in the high frequency window, it is determined that the frequency bypass condition is satisfied. If there is a value that exceeds the window, no frequency bypass flag is outputted.

Figure 4:
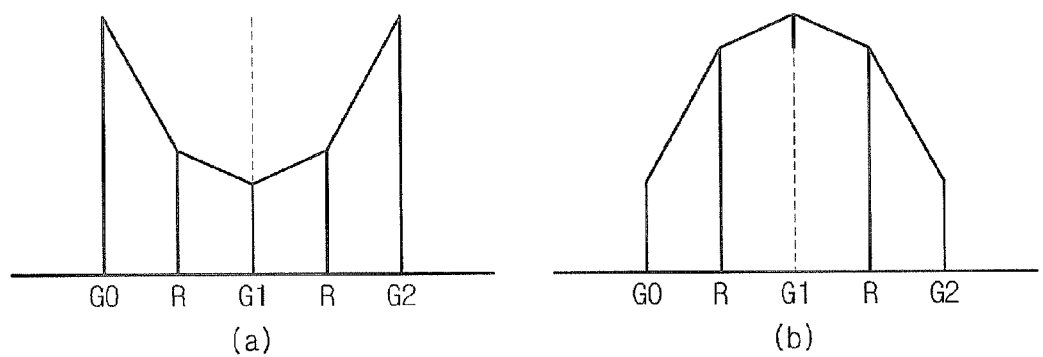
FIG. 4 shows a diagram for describing a method for detecting a pattern.
Figure 5:
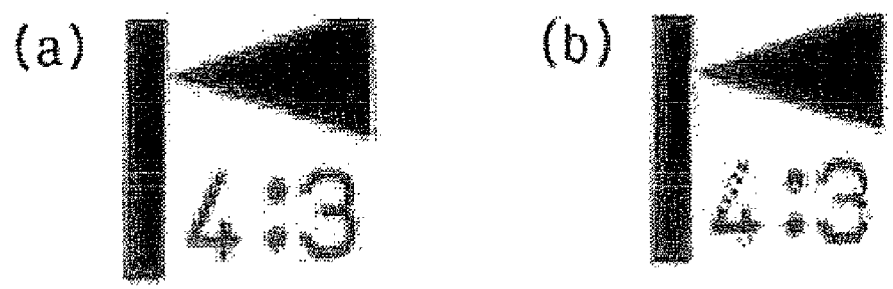
FIG. 5 shows a comparison of an actual image before and after applying the method for detecting a pattern.

Referring back to FIG. 2, a pattern detection unit 240 determines if the difference between the reference pixel value and the neighboring pixel value is smaller than a predetermined threshold and, if smaller, outputs a pattern bypass flag. Although a series of pixel values are actually inputted in the form of a Bayer pattern (GRGB . . . ), since conventional algorithms handle the same elements only, a high frequency element tends to be replaced by a low frequency element, or vice versa, thereby resulting in distortion of the color, when the resolution chart is photographed in black and white. Thus, this problem can be solved by determining whether the reference pixel value is to be bypassed, through a relative comparison of the G-R elements or G-B elements. Referring to FIG. 4 and FIG. 5 to describe this in detail, when the dead pixel processing unit 220 is only applied, G1, shown in FIG. 4(a), is determined to be a dead pixel because it is substantially smaller than the neighboring same kind pixel values, and is substituted by a value represented by the dotted line. The original image of FIG. 5(a) is distorted to an image shown in FIG. 5(b). Likewise, since G1, shown in FIG. 4(b), is substantially larger than the neighboring same kind pixel values, it is determined to be a dead pixel and is substituted by a value represented by the dotted line. The predetermined threshold is stored in a register of the frequency detection unit 230 and can be substituted by a register value inputted from outside. Moreover, the register can further comprise data that selects the operation of the pattern detection unit 240. Therefore, the pattern detection unit 240 may not operate in accordance with the register value.

The frequency flag, outputted from the frequency detection unit 230, and the pattern flag, outputted from the pattern detection unit 240, are used as the condition to determine whether to bypass the reference pixel value, determined to be a dead pixel by the dead pixel processing unit 220, without substituting to a compensated pixel value. Thus, the dead pixel processing device may comprise only one of the frequency detection unit 230 and the pattern detection unit 240. Moreover, since the operation of the frequency detection unit 230 and the pattern detection unit 240 can be determined by the predetermined register value, the user can choose either one or both of the frequency detection unit 230 and the pattern detection unit 240 for processing the dead pixel.

A selection unit 250 outputs one of the reference pixel value and the output value of the dead pixel processing unit, depending on the combination of the inputted frequency bypass flag and/or pattern bypass flag. The selection unit 250 determines the output to correspond to the combination of flags inputted from each detection unit, based on the On/Off signal inputted in order to select either one or both of the frequency detection unit 230 and the pattern detection unit 240. In case both the frequency detection unit 230 and the pattern detection unit 240 are selected, the bypass condition is considered to be satisfied, and thus the reference pixel value is bypassed, when the flags are inputted from both sides. In case one of the frequency detection unit 230 and the pattern detection unit 240 is selected, only one flag can be inputted to satisfy the bypass condition, and thus the reference pixel value is bypassed. In case neither the frequency detection unit 230 nor the pattern detection unit 240 is selected, the bypass condition is not applied, and thus the output value of the dead pixel detection unit 220 is outputted as is. The above description is summarized in the table below:

TABLE 1

| ON/OFF | Bypass Flag | Selected Output |
| --- | --- | --- |
| Both frequency detection unit and pattern detection unit turned on | Frequency flag and pattern flag | Reference pixel value |
| | Frequency flag or pattern flag | Output by dead pixel processing unit |
| | None | |
| Only one turned on | Frequency flag or pattern flag | Reference pixel value |
| | None | Output by dead pixel processing unit |
| Both turned off | None | Output by dead pixel processing unit |

Figure 6:
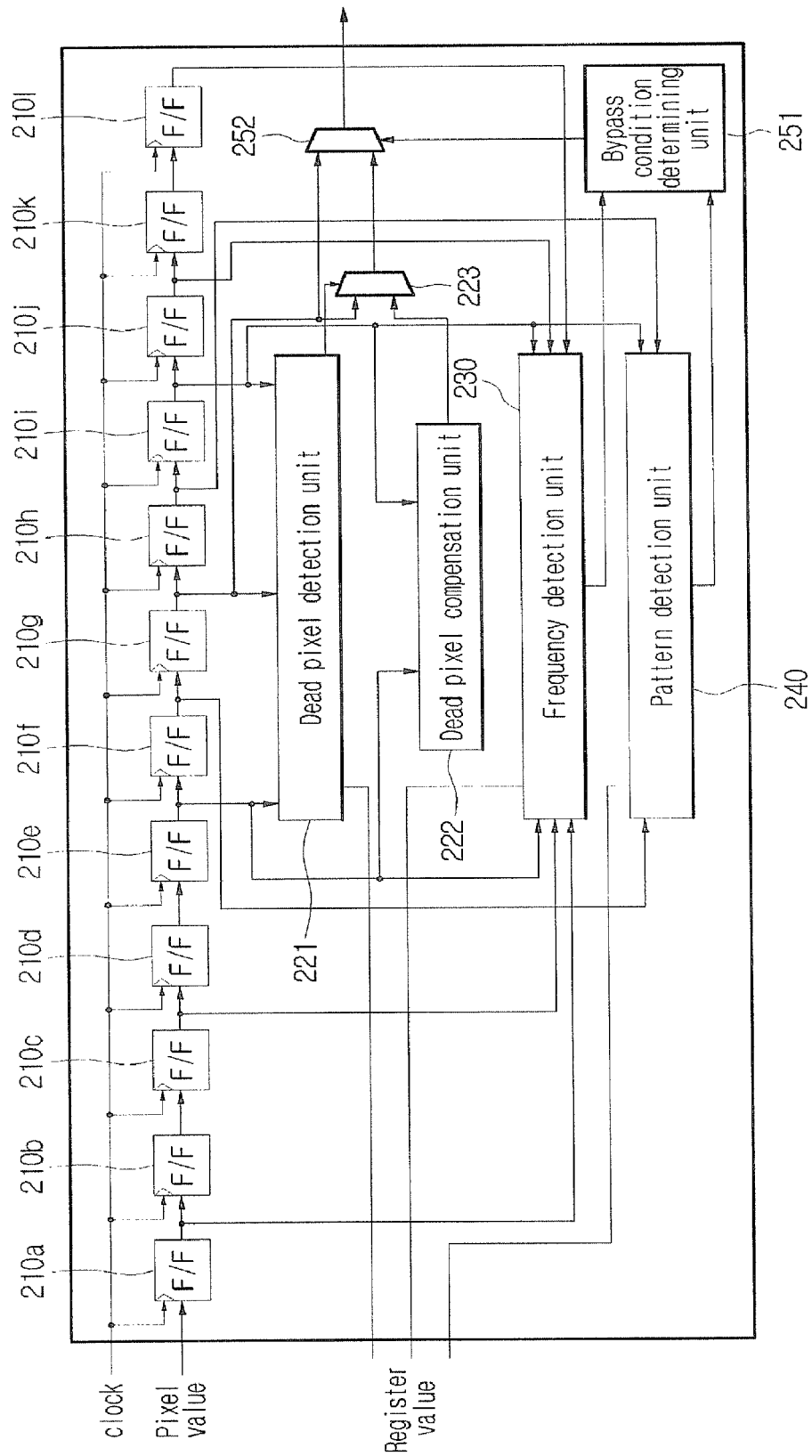
FIG. 6 shows a block diagram of an apparatus for processing dead pixels in accordance with a preferred embodiment of the present invention.

FIG. 6 is a block diagram illustrating an apparatus for processing dead pixels in accordance with a preferred embodiment of the present invention. The default values for a dead pixel detection unit 221, the frequency detection unit 230, and the pattern detection unit 240 are stored in the register and can be modified. A plurality of flip-flops 210a-210l store a series of pixel values. The inputted pixel values are maintained by the flip-flops and move to the right when a new pixel value is inputted. The dead pixel processing unit 220, shown in FIG. 2, can comprise a dead pixel detection unit 221, a dead pixel compensation unit 222, and a first multiplexer 223. The dead pixel detection unit 221 receives the value outputted from a 7th flip-flop 210g, which maintains the reference pixel value, and the values of a 5th flip-flop 210e and a 9th flip-flop 210i, which maintain the neighboring same kind pixel values, and determines whether the reference pixel value is a dead pixel, and outputs a dead pixel bypass flag if the reference pixel value is not a dead pixel. The dead pixel compensation unit 222 receives the values of the 5th flip-flop 210e and the 9th flip-flop 210i, which maintain the neighboring same kind pixel values, and outputs a compensated pixel value. The compensated pixel value is a calculated average of the values of the 5th flip-flop 210e and the 9th flip-flop 210i, and the dead pixel compensation unit 222 can be embodied as an adder and a shifter. A 1st multiplexer 223 selects one of the output value of the 7th flip-flop 210g and the output value of the dead pixel detection unit 222, but selects and outputs the output value of the 7th flip-flop 210g, i.e. the reference pixel value, if there is a dead pixel bypass flag outputted from the dead pixel detection unit 221. If there is no flag, the 1st multiplexer 223 selects and outputs the output value of the dead pixel detection unit 222, i.e. the compensated pixel value.

The frequency detection unit 230 receives the output values of a 1st flip-flop 210a, a 3rd flip-flop 201c, the 5th flip-flop 210e, the 9th flip-flop 210i, a 10th flip-flop 210j, and a 12th flip-flop 210l and determines whether the values are within the window, in which the frequency of image lines maintained by the 12 flip-flops is set.

The pattern detection unit 240 receives the output values of the 5th flip-flop 210e, a 8th flip-flop 210h, and the 9th flip-flop 210i and determines whether the difference of the absolute values with the neighboring pixel values is smaller than the threshold.

The selection unit 250 of FIG. 2 can comprise a bypass condition determining unit 251 and a 2nd multiplexer 252. The bypass condition determining unit 251 selects one of the input values of the 2nd multiplexer, depending on the operation status (On or Off) of the pattern detection unit 240 and the combination of outputted flags, as shown in Table 1.

Figure 7:
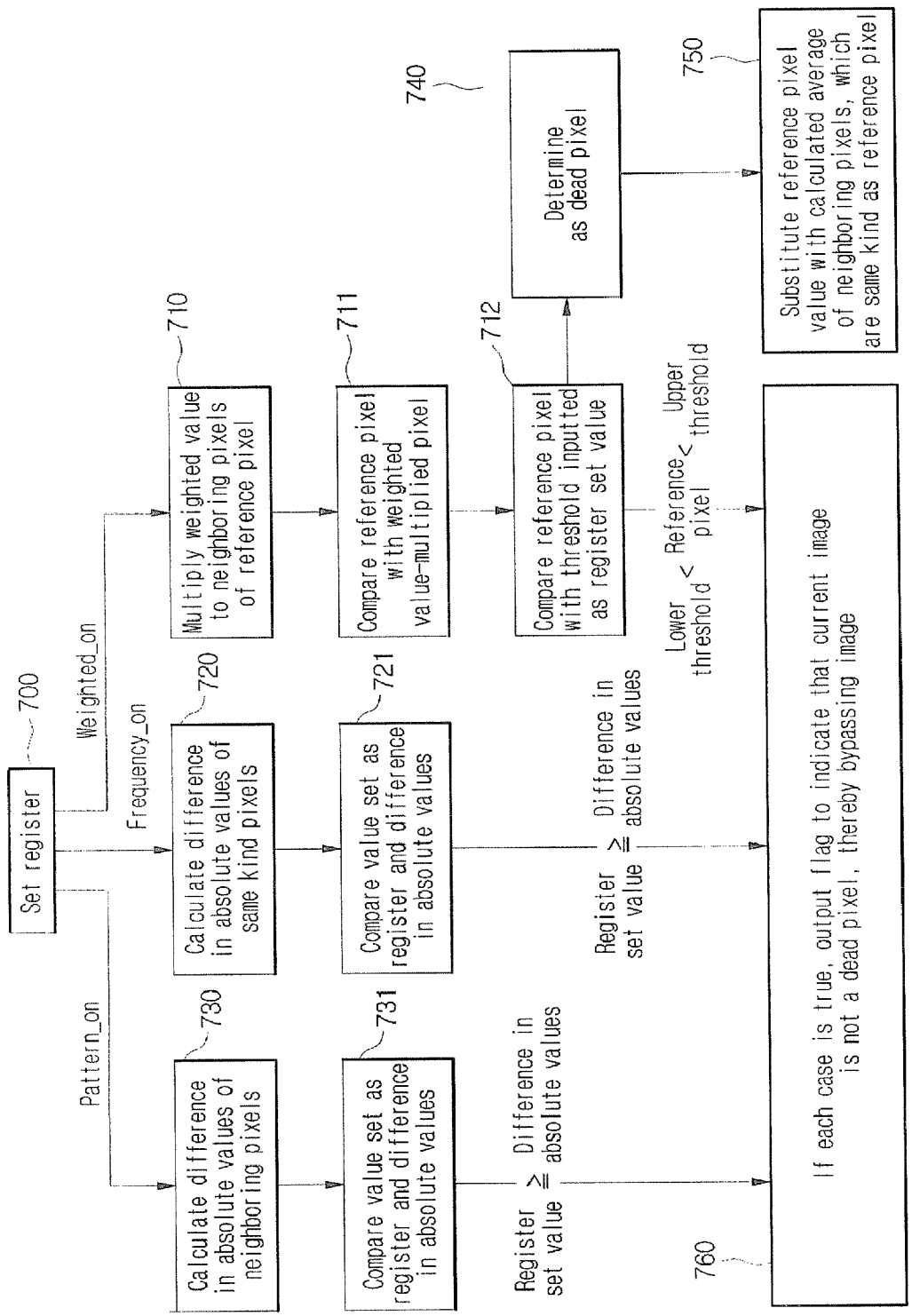
FIG. 7 shows a flowchart of the operative process of the apparatus for processing dead pixels shown in FIG. 6.

FIG. 7 is a flowchart showing the operative process of the apparatus for processing dead pixels shown in FIG. 6. In step 700, the register values of the dead pixel detection unit, frequency detection unit, and pattern detection unit are set, and the detection unit to operate is selected. Hereinafter, the case of selecting all detection units will be described. If the dead pixel detection unit is selected and operates, a weighted value is multiplied to the neighboring pixel of the reference pixel in step 710, and then the neighboring pixel value, to which the weighted value is multiplied, is compared with the reference pixel value. In step 712, if the reference pixel value is smaller than the neighboring pixel value, to which the weighted value is multiplied, the reference pixel is not considered as a dead pixel. However, if the reference pixel value is larger than all of the neighboring pixel values, to which the weighted value is multiplied, it is determined whether the reference pixel value is located between the upper threshold and the lower threshold set by the register value. If the reference pixel value is located between the upper threshold and the lower threshold, the reference pixel is not considered as a dead pixel, and a dead pixel bypass flag is outputted. If the reference pixel value is outside the range, however, the reference pixel value is determined to be a dead pixel, and a dead pixel bypass flag is not outputted, in step 740. If there is no dead pixel bypass flag, the average value of neighboring same kind pixel values is calculated and outputted, in step 750.

If the frequency detection unit is selected and operates, the differences in absolute values of the same kind pixels are calculated, in step 720, and it is determined whether all of the calculated differences are located within the window predetermined by the register value. If all of the calculated differences are located within the window, a frequency bypass flag is outputted.

If the pattern detection unit is selected and operates, the differences in absolute values of the neighboring pixels are calculated, in step 720, and it is determined whether the calculated differences are smaller than the threshold predetermined by the register value. Here, the neighboring pixels can be different elements from the reference pixel. If all of the calculated differences are smaller than the threshold, a pattern bypass flag is outputted.

In step 760, if all of the dead pixel detection unit, frequency detection unit, and pattern detection unit output bypass flags, the reference pixel value is outputted as is. However, if the frequency bypass flag or the pattern bypass flag is missing, a compensated pixel value is outputted.

So far, an embodiment applied to the compensation of the dead pixel value, occurred by a dead pixel of an image sensor, has been described, but the inputted image does not necessarily have to be generated by an image sensor. In other words, the apparatus for processing a dead pixel in accordance with the present invention can also be used as a noise filter for removing random noise, salt noise, and pepper noise, occurred in a normal image. Furthermore, in the embodiment for processing a dead pixel of an image sensor, illustrated in FIG. 6, a series of inputted pixel values maintain a Bayer pattern, and thus it is difficult to realize a module that is separated according to color elements, but it is possible to realize a dedicated filter according to the color element if it is realized as a noise filter.

As described above, with the present invention, the distortion of an image, caused by erroneously classifying a normal pixel of an inputted image as a dead pixel, is significantly reduced, thereby improving the quality of a processed image. Moreover, based on the characteristics of the inputted image, the algorithm and accuracy of detecting a dead pixel can be adjusted.

Although a preferred embodiment of the present invention has been described, anyone of ordinary skill in the art to which the invention pertains should be able to understand that a very large number of permutations are possible without departing the spirit and scope of the present invention, which shall only be defined by the claims appended below.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for detecting a dead pixel, comprising:
a pixel value storage unit configured to store a series of pixel values, said series of pixel values including a reference pixel value;
a dead pixel processing unit configured to bypass said reference pixel value by comparing said reference pixel value with a neighboring same kind pixel value or generating a compensated pixel value by using said neighboring same kind pixel value;
a frequency detection unit configured to generate a frequency bypass flag when differences between a plurality of same kind pixel values are smaller than an upper first threshold, bigger than a lower second threshold, or between said upper first threshold and said lower second threshold, wherein said values of said upper first threshold and lower second threshold are selected based on a frequency of said image;
a pattern detection unit configured to generate a pattern bypass flag if a difference between said reference pixel value and a neighboring pixel value is smaller than a third threshold; and a selection unit configured to select one of said reference pixel value and an output value of said dead pixel processing unit by a combination of said frequency bypass flag and said pattern bypass flag.

2. The apparatus for detecting a dead pixel of claim 1, wherein said dead pixel processing unit comprises:
- a dead pixel detection unit configured to generate a dead pixel bypass flag when said reference pixel value is compared with said neighboring same kind pixel value and determined to be a normal pixel;
- a dead pixel compensation unit configured to generate said compensated pixel value using said neighboring same kind pixel value; and
- a multiplexer configured to receive said reference pixel value and said compensated pixel value, said multiplexer outputting said reference pixel value in accordance with said dead pixel bypass flag.

3. The apparatus for detecting a dead pixel of claim 1, wherein said first upper threshold, said second lower threshold or said third threshold is adjustable.

4. The apparatus for detecting a dead pixel of claim 1, wherein an operation of said frequency detection unit and said pattern detection unit is determined by a predetermined register value.

5. The apparatus for detecting a dead pixel of claim 4, wherein said selection unit outputs one of said reference pixel value and said output value of said dead pixel processing unit by said combination of said bypass flags corresponding to an operation status of said frequency detection unit and said pattern detection unit.

6. The apparatus for detecting a dead pixel of claim 1, wherein said selection unit selects said reference pixel value when at least one of said frequency bypass flag and said pattern bypass flag is generated.

7. The apparatus for detecting a dead pixel of claim 1, wherein said pixel value storage unit comprises a plurality of flip-flops configured to store said series of pixel values, said dead pixel processing unit obtains pixel values of a fifth, a seventh and a ninth of said plurality of flip-flops, said frequency detection unit obtains pixel values of a first, a third, the fifth, the ninth a tenth and a twelfth of said plurality of flip-flops, and said pattern detection unit obtains pixel values of the fifth, an eighth and the ninth of said plurality of flip-flops.

8. An apparatus for detecting a dead pixel, the apparatus comprising:
- a pixel value storage unit configured to store a series of pixel values, said series of pixel values including a reference pixel value;
- a dead pixel processing unit configured to bypass said reference pixel value by comparing said reference pixel value with a neighboring same kind pixel value or generating a compensated pixel value by using said neighboring same kind pixel value;
- a frequency detection unit configured to generate a frequency bypass flag when a differences between a plurality of same kind pixel values are smaller than an upper first threshold, bigger than a lower second threshold, or between said upper first threshold and said lower second threshold, wherein said values of said upper first threshold and said lower second threshold are set based on a frequency of said image; and
- a selection unit configured to select one of said reference pixel value and an output value of said dead pixel processing unit by said frequency bypass flag.

9. The apparatus for detecting a dead pixel of claim 8, wherein said upper first threshold and said lower second threshold are adjustable.

10. The apparatus for detecting a dead pixel of claim 8, wherein an operation of said frequency detection unit is determined by a predetermined register value.

11. The apparatus for detecting a dead pixel of claim 8, wherein said selection unit selects said reference pixel value when said frequency bypass flag is generated.

12. The apparatus for detecting a dead pixel of claim 8, wherein said pixel value storage unit comprises a plurality of flip-flops configured to store said series of pixel values, said dead pixel processing unit obtains pixel values of a fifth, a seventh and a ninth of said plurality of flip-flops, and said frequency detection unit obtains pixel values of a first, a third, the fifth, the ninth a tenth and a twelfth of said plurality of flip-flops.

* * * * *